United States Patent [19]

Frankiewicz et al.

[11] 4,144,310
[45] Mar. 13, 1979

[54] HIGH SLURRY DENSITY SULFIDIC MINERAL LEACHING USING NITROGEN DIOXIDE

[75] Inventors: Theodore C. Frankiewicz, Westminster, Calif.; Robert E. Lueders, Needham, Mass.

[73] Assignee: Kennecott Copper Corporation, New York, N.Y.

[21] Appl. No.: 856,201

[22] Filed: Nov. 30, 1977

[51] Int. Cl.² ............................ C01G 3/10; C01G 9/06; C01G 53/10
[52] U.S. Cl. .................................... 423/27; 423/36; 423/53; 423/109; 423/150
[58] Field of Search ................. 75/101 R, 115, 117; 423/27, 34, 36, 41, 109, 145, 146, 150, 27

[56] References Cited

U.S. PATENT DOCUMENTS

| | | | |
|---|---|---|---|
| 2,871,116 | 1/1959 | Clark | 75/115 |
| 3,793,429 | 2/1974 | Queneau et al. | 423/34 |

OTHER PUBLICATIONS

Habashi, F., *Extractive Metallurgy,* vol. 2, Gordon & Breach, N.Y. (1970), pp. 15-19.

*Primary Examiner*—Brian Hearn
*Attorney, Agent, or Firm*—John L. Sniado; Anthony M. Lorusso

[57] ABSTRACT

An energy efficient process is disclosed for the hydrometallurgical oxidation of sulfidic minerals containing copper, silver, nickel, cobalt, molybdenum, or zinc values. A high density slurry, e.g., 67% by weight solids, is prepared from a particulate sulfide mineral and water. Nitrogen dioxide and preferably also oxygen are added to the slurry to oxidize the sulfidic minerals and to produce solubilized cations and nitric oxide. The nitric oxide is oxidized to nitrogen dioxide, thereby regenerating the principal oxidant. If oxygen is added to the slurry along with $NO_2$, then the regeneration occurs in-situ.

12 Claims, 1 Drawing Figure

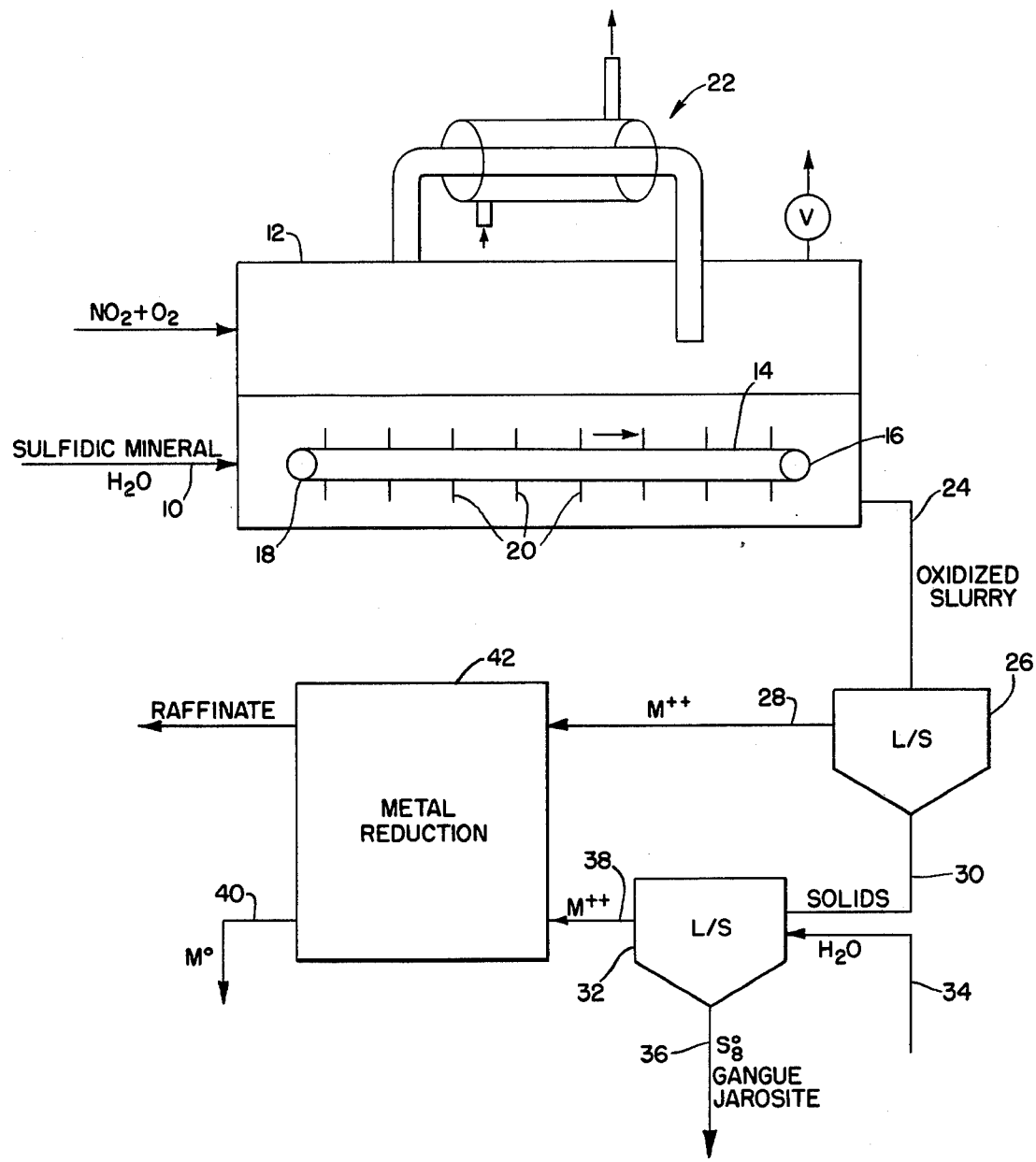

HIGH SLURRY DENSITY SULFIDIC MINERAL LEACHING USING NITROGEN DIOXIDE

BACKGROUND OF THE INVENTION

This invention relates to the hydrometallurgical oxidation of sulfidic minerals, more particularly copper minerals, utilizing an aqueous leaching slurry and nitrogen dioxide gas as an oxidant. More specifically, it relates to an energy efficient sulfidic mineral leaching procedure employing a high slurry density leach liquor.

The conventional high temperature oxidation of sulfides has the advantages of being relatively non-selective in terms of mineral reactivities and of consuming much less energy during the oxidation process as compared with most hydrometallurgical oxidation processes. Unfortunately, roasts of this type produce large volumes of relatively dilute sulfur dioxide off-gas which, in order to comply with environmental protection standards, must be collected, scrubbed, etc. by relatively expensive ancillary equipment. However, despite this disadvantage, high temperature oxidation processing of sulfidic minerals has been preferred in the art because the hydrometallurgical processes are even more expensive.

The relatively high cost of nitric acid containing hydrometallurgical processes is due to several factors. First, if oxidant regeneration techniques are not employed, large volumes of liquid are required in order to supply sufficient nitric acid in a sulfuric acid-nitric acid leach liquor to generate an acceptably high concentration of soluble metal values. This also results in a considerable amount of wasted nitrate. Furthermore, the kinetics of the conventional nitric-acid leach are such that large amounts of power are consumed to maintain the slurry suspension, to preheat and cool the slurry, and to move about the large volumes of leach liquor used. While the use of a nitric-acid plant to regenerate the oxidant minimizes loss of nitrate in such processes, it also increases the capital cost of the system. Another expense associated with conventional nitric-acid hydrometallurgical leaching procedures is the cost of collecting and regenerating relatively large volumes of off-gas which are produced as a reaction by-product. The capital expense involved with capturing, scrubbing, recycling, etc. the off-gas significantly contributes to the capital cost of the process.

Copending application Ser. No. 855,983 to T. C. Frankiewicz et al., filed on even date herewith, entitled "Copper Leaching Process Employing Nitrogen Dioxide" discloses an improved hydrometallurgical oxidation procedure wherein nitrogen dioxide is used as an oxidizing agent in an aqueous acidic leach liquor. The teachings of the foregoing application are incorporated herein by reference. While the procedure disclosed in that application is characterized by many advantages, it nevertheless suffers from the high-energy cost associated with mixing and moving about relatively large volumes of low slurry density leach liquors. Furthermore, as is true with most such leaching procedures, all the metal values which react become solubilized in a single aqueous phase, requiring a down-stream separation technique for, e.g., separating iron, nickel, copper, etc. values from each other.

Many of the disadvantages of aqueous sulfide oxidations would be eliminated if the oxidation reaction rates could be improved and the normally required use of large liquid dilution volumes were circumvented. Such a process would be ideal and could effectively compete with high temperature oxidation if, in addition to the foregoing advantages, relatively little off-gas was produced which had to be captured and treated for recycle.

SUMMARY OF THE INVENTION

It has now been discovered that the nitrogen dioxide aqueous leaching system disclosed in the application mentioned above may be modified by employing high density slurries. This modification results in several advantages such as essentially eliminating the production of off-gas, lowering the energy costs associated with conventional hydrometallurgical procedures, and significantly reducing required reactor sizes.

In accordance with the process of the invention, sufficient water is added to a particulate sulfidic mineral to produce a non-caking, high-density slurry. The advantages of the invention are optimized as the percentage of solids by weight in the slurry are increased. Thus, while advantages accrue if a 30% weight slurry is employed, the percent of solids by weight in the slurry is typically set to at least 50% or preferably above 67%. This is in contrast to the conventional leaching slurry densities which typically lie within the range of 10–20%. Such concentrated slurries remain suspended with little or no mechanical assistance. This results in considerable energy savings because a low power input is sufficient to agitate the slurry. When a gas comprising oxygen and nitrogen dioxide is introduced into the slurry and mechanical agitation or sparging techniques are utilized to contact the gas with slurry particles, the sulfidic minerals are oxidized to enable solubilization or separation of the desired metal values. During the sulfide oxidation, nitrogen dioxide is reduced to nitric oxide. Because of the oxygen content of the gas, nitric oxide is reoxidized back to nitrogen dioxide in-situ. Only trace net amounts of off-gas are produced and the reaction temperature is easily controlled by collecting and condensing water vapor. At the high-slurry density employed, iron frequently associated with sulfidic copper minerals such as chalcopyrite precipitates as a substantially water insoluble jarosite which may be easily removed from the aqueous phase together with the gangue. Furthermore, at certain high-slurry densities, cupric sulfate precipitates during the course of the leach as its concentration passes the saturation point. In this circumstance additional water may be added to the leach liquor at the conclusion of the leach to solublize the copper values.

The leaching procedure of the invention is adaptable for treating sulfidic minerals containing silver, nickel, cobalt, iron, molybdenum, zinc and copper values. Chalcopyrite, bornite, chalcocite, digenite, covellite, mixtures thereof, and concentrates thereof may be treated.

Accordingly, it is an object of the invention to provide a hydrometallurgical oxidation procedure which is economically competitive with roasting techniques.

Another object of the invention is to provide a leaching process which utilizes a slurry density significantly greater than that used in conventional prior art leaching techniques, thereby reducing the energy costs associated with pumping, suspending and agitating the leach liquor.

Another object of the invention is to provide a leaching system characterized by high reaction rates.

Still another object of the invention is to provide a leaching procedure wherein the oxidant is regenerated in-situ by oxygen gas.

Another object of the invention is to provide a leaching process wherein required reactor volumes are 10-20 times less than those required by conventional leaching processes.

BRIEF DESCRIPTION OF THE DRAWING

The sole FIGURE of the drawing is a schematic diagram illustrating a copper recovery process embodying the high-slurry density leaching procedure of the invention.

DESCRIPTION OF THE PREFERRED EMBODIMENT

As is shown in the sole FIGURE of the drawing, a particulate sulfidic mineral, e.g., a chalcopyrite concentrate particulated to −325 mesh, is introduced at 10 into a leaching tank 12 together with sufficient water such that a non-caking, desired high-slurry density is achieved. The percent by weight of the solids in the feed slurry is at least about 30%, but will typically range upwards of 50% and preferably be at least 67%. At such high-slurry densities, little energy is required to maintain the mineral particles in a suspended state. Only occasional turning or raking of the two-phase system is required which, in and of itself, leads to energy savings. By way of illustration, a continuous belt 14 entrained about a drive pulley 16 and a driven-pulley 18, and having a plurality of paddles 20 may be used to advantage. Alternatively, a rotary kiln or "cement mixer" as well as a Hershoff furnace can be used to advantage.

In accordance with the invention, a nitrogen dioxide and oxygen containing gas is introduced into or above the slurry. The slurry may optionally be acidified; however, because of the high-slurry densities employed it is not required that sulfuric acid or the like be added. This point is amplified later. The preferred oxidant gas mixture consists of a binary mixture of nitrogen dioxide and oxygen, undiluted with other gases inert to the reactions. Alternatively, $NO_2$ alone may be introduced and the $O_2$ used to reoxidize the product NO in a separate reactor. It is preferred to introduce the gases at a pressure of 0–15 lbs. psig. However, it is contemplated that the leach may be conducted by employing a mixture of nitrogen dioxide and oxygen diluted with nitrogen gas or other diluent gases at pressures in excess of 15 lbs. psig. The choice of whether to use reagent grade nitrogen dioxide and oxygen or to simply admix nitrogen dioxide with air will largely be an economic decision based primarily on the effect of introducing nonessential gases on the kinetics of the leach.

At the beginning of the leach copper, iron, silver, molybdenum, nickel, etc. become solubilized in the aqueous phase of the leach liquor as the sulfide becomes oxidized. As the leach proceeds, these values may precipitate as is explained below. It is believed that the mechanism of the oxidation involves the $NO^+$ ion which is formed in-situ in accordance with the well-known equations:

$$NO_2 \text{ (g)} \rightleftharpoons NO_2 \text{ (aq)}$$

$$2\, NO_2 \text{ (aq)} \rightleftharpoons NO^+ + NO_3^-$$

The nitric oxide positive ion produced as shown above is unstable and reacts with water in the presence of nitrogen dioxide to produce solubilized nitrous and nitric acid, hydrogen ions, and nitric oxide in accordance with the equations:

$$NO^+ + H_2O \rightleftharpoons HNO_2 + H^+$$

$$HNO_2 + NO_2 \text{ (aq)} \rightleftharpoons HNO_3 + NO \text{ (g)}$$

Because of the high-slurry densities employed in the present invention, the concentration of $HNO_3$ on the surface of a damp particle is relatively high compared to the [$HNO_3$] developed when the process set forth in copending application Ser. No. 855,983 is employed. Because of the high concentration of $HNO_3$, the nitric acid can serve as its own source of $H^+$. Of course, the [$HNO_3$] will be high at the conclusion of the oxidation. However, this is not detramental because there is so little water present in the slurry, that upon dilution, [$NO_3^-$] will be lowered automatically to a desirable level.

From the foregoing it may be seen that nitrate is produced during the course of the leach. The reason why nitrates are believed to be effective oxidants of sulfidic minerals is because the $NO_3^-$ ion produces the oxidant $NO^+$. In other words, it is the nitric oxide positive ion which is capable of rapidly and directly oxidizing sulfidic minerals contained in the slurry. Thus, as an example, when the solids contain CuS, the copper is solubilized in accordance with the equation:

$$2\, NO^+ + CuS \rightleftharpoons Cu^{++} + S^\circ + 2\, NO$$

A kinetic analysis of these reactions indicates that sulfide oxidation rates are governed by the product:

Oxidation rate = $\alpha P_{NO_2} \cdot P_{NO} \cdot [HNO_3]$ wherein alpha is a constant dependant, inter alia, on temperature. Thus, the primary oxidant is $NO^+$ which is produced from $NO_2$; and NO and $HNO_3$ are generated within the slurry. It should be noted that the listed reactions are in equilibrium so that NO gas is capable of reacting with $HNO_3$ to form additional $HNO_2$ and, indirectly, $NO^+$. Of course, $NO_2$ has several unique advantages as an oxidant, notably, its high aqueous solubility and its ability to be easily regenerated on the particle surface in the presence of oxygen gas in accordance with the equation:

$$2\, NO + O_2 \rightarrow 2NO_2$$

Accordingly, mass transfer of the oxidant to the sulfide surface is rapid.

In the conventional nitric acid leaching systems without oxidant regeneration, for practical reasons, large volumes of liquid are required and this results in a considerable amount of wasted nitrate since carrying the oxidation reaction to zero [$NO_3^-$] is difficult and slow. In contrast, the chemistry outlined above suggests that only enough water is required to ensure that the sulfide slurry is noncaking since the $NO_2$ - $O_2$ atmosphere provides rapid continuous oxidant regeneration.

Another advantage of the process of the invention lies in its inherent ability to regulate reaction temperature despite the exothermic nature of the oxidation. Thus, as the temperature of the slurry increases, heat will be lost through evaporation of water. As illustrated in the drawing, vapor produced in this manner may be readily condensed by, e.g., a water cooled condenser 22, and returned to the leaching vessel 12 to conserve water mass balance. If $P_{H_2O}$ is allowed to increase without allowing total reactor pressure to increase, then $P_{NO}$ and $P_{NO_2}$ will of necessity, be decreased. Accordingly, as revealed above, the rate of exothermic leaching will decrease. Thus, an automatic temperature regulation is contained within the sulfide oxidation stoichiometry.

At this point it should be noted that the kinetics of the foregoing leach are such that the reaction time to completion is about one-fourth that of the conventional nitric acid-sulfuric acid leach. Also, the slurry volumes supplied to the reactor (due to the high slurry density) may be in the vicinity of only one-fifth that of a conventional leach treating the same mass of solids. Accordingly, the inventory of reacting slurry can have a volume of approximately one-twentieth that of conventional leaches. From these figures it can be appreciated that power consumption for mixing and maintaining the suspension of the slurry, as well as reactor volume, may be reduced by at least a similar ratio. Furthermore, using a reactor similar to the well-known Hershoff furnace, the sulfide oxidation is self-starting and autogenous. Therefore, further capital and operating costs reductions over conventional leaching systems are realized since slurry preheating and final cooling are not required.

As is well known, oxidation of the sulfide ore enables the metal values to become solubilized in the aqueous leach liquor. However because of the low levels of water used in the present process, as particle oxidation proceeds, $Cu^{++}$, $Fe^{++}$, $Fe^{+++}$, $SO_4^=$, etc. concentrations increase to the point where copper sulfate, iron sulfate, jarosite, etc. will precipitate. Similarly, a considerable amount of elemental sulfur will form. Of course, the formation of such precipitates does not present any problem since sulfates of the desired metals, that is copper, silver, nickel, cobalt, molybdenum, and zinc sulfates, are soluble in water. Therefore these sulfates can be solubilized in a downstream operation after the high slurry density oxidation step has been performed. Of course, the metal values can be separated from each other by many techniques such as selective ion exchange extraction. Such separation techniques are well known in this art.

At the conclusion of the leach, the slurry exits via conduit 24 and is separated into liquid and solid phases by conventional separator 26. The aqueous phase containing cationic metal values is delivered via conduit 28 directly to means for reducing the metal values 42, e.g., a cell for electrowinning copper or a suitable organic extraction system. The solids comprise elemental sulfur, gangue materials, jarosite (if iron was present in the particulate sulfidic ore), as well as precipitated sulfates of metal values such as copper sulfates, if the preferred very high slurry density was employed. These are delivered via conduit 30 to liquid-solid separator 32. Sufficient water is added to the separator via conduit 34 to solubilize the copper or other metal sulfate. After separation, the remaining solids (predominantly gangue, sulfur, and jarosite) exit via conduit 36 and the cationic, now solubilized, metal values are introduced into the pregnant liquor purification and metal production means, 42, via conduit 38. After reduction and/or separation of the metal values, metal is collected at 40.

The invention will be further understood from the following nonlimiting examples.

A series of experiments using chalcopyrite was conducted employing an initial slurry density of 67% solids by weight. In these experiments, dry solids were placed in a reactor at 90° C. and water was added until the desired slurry density was achieved. Oxygen and nitrogen dioxide were then supplied to the space above the slurry and mixing was effected using a 30 rpm 4-blade impeller. Water evaporation was observed to limit the rate of reaction by inhibiting oxidant regeneration and thus slurry overheating was not a problem. After 80–90 minutes, the sulfides were completely oxidized as evidenced by a sudden halt in bubble formation in the slurry. The results of the experiments are summarized in Table I

TABLE I

| Expt. | t (min) | Cu | Fe | Mo | Cu/NO In Pregnant Liquor | Comments |
|---|---|---|---|---|---|---|
| I | 60 | 99% | 69% | 60% | .91 | |
| II | 105 | 100 | 88 | 88 | .56 | |
| III | 115 | 100 | 73 | 90 | .36 | $Na_2SO_4$ added |
| IV | 75 | 84 | 63 | 45 | 1.8 | 10% $H_2SO_4$ Slurry |

At the conclusion of each leach, the oxidant gas was flushed from the reactor and additional water was added to the slurry to give a final $Cu^{++}$ of 50–75 g/l. The residual solids analyzed as sulfur, gangue minerals, hydrogen jarosite, and/or sodium jarosite, depending on whether excess sodium was supplied to the reactor as $Na_2SO_4$. Some iron was also left in solution together with residual nitrate.

In the foregoing experiments, the final nitrate concentration was excessive because of the manner in which the experiments were performed. Nevertheless, the experiments demonstrate that about 80% of the sulfide being processed can be oxidized using the high slurry density leach of the invention. The remaining 20% will be required to destroy residual nitrate in the conventional manner. Employing optional conditions such as stopping $NO_2$ addition before the reaction ends (see IV) and then allowing residual $NO_3^-$ to oxidize the last few % of sulfides (not done in IV), the $Cu^{++}$ to $NO_3^-$ ratio will be $\geq 2$ and only 5% to 10% fresh sulfide will be required for nitrate destruction.

From the foregoing it should be clear that an essential feature of the present invention is to utilize a high density slurry and the gaseous $NO_2$ oxidant. It is preferred to utilize only enough water so that the resulting slurry is non-caking. Thus, the slurry can contain as much as 67% or more by weight of solids with the balance comprising water. Of course, improved results are obtained with slurries having a solids content as low as 30% by weight. Indeed, slurries containing 30% by weight solids have a higher solids content than slurries that are normally processed in conventional nitric acid leach processes.

Such slurries are produced by particulating the sulfide ore to be leached to a size of −60 mesh or smaller and adding the particles to a sufficient amount of water. Once the slurry is produced, a gaseous mixture containing nitrogen dioxide and oxygen is introduced into the slurry. The amount of nitrogen dioxide in this gaseous mixture will vary depending on the stoichiometry of the reaction. It is desirable to have an amount of nitrogen dioxide that is slightly in excess of the stoichiometric amount needed to oxidize the sulfide ore being treated. The amount of oxygen present in the gaseous mixture will, of course, depend on the amount of nitrogen dioxide present. It is preferred to utilize an amount of oxygen that is slightly in excess of the amount needed to regenerate the nitric oxide produced during oxidation of the sulfide back to nitrogen dioxide. Of course, details of how to calculate the correct stoichiometric amounts of these two gases is well within the skill of those in this art. The sparging rate of the two gases is not critical and would vary according to the amount of slurry being treated and the residence time of the slurry in a reactor. Indeed, the entire nitrogen dioxide and oxygen requirements of a particular batch of slurry being treated may be added to a closed reactor at one time. In this embodiment the reactants are agitated until the sulfide ore has been oxidized. The oxidized slurry would then be removed from the reactor and a fresh batch of slurry would be reintroduced. Of course, the gas used in the preceeding batch would still be capable of oxidizing a new batch of slurry since nitrogen dioxide was regenerated by oxygen. However, additional makeup oxygen should be added to the second batch as required to insure continuous regeneration of the nitrogen dioxide as the process proceeds in a batch operation.

It is preferred to maintain the reaction temperature at a value of less than 115° C. The preferred reaction temperature is between the range of 85° C. to 110° C. The temperature can be controlled by cooling the slurry with water which has been condensed by condenser 22.

It is preferable to maintain the pressure during oxidation of the slurry at about atmospheric pressure. It is, however, possible to conduct the oxidation operation at pressures of 15 to 35 psi., absolute.

The materials treated in accordance with the present invention are sulfidic materials containing desired metal values. The materials may be in the form of ores or ores which have been concentrated. Thus, the material being treated may be either an ore or a concentrate in sulfidic form which contains recoverable metal values such as copper, silver, nickel, cobalt, molybdenum, zinc, iron, and mixtures thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for oxidizing a sulfidic material containing copper values to enable the copper values to be leached therefrom comprising the following steps:
   A. adding a sufficient amount of water to the sulfidic material while in particulate form to produce a noncaking slurry having a solids content of no less than 30% by weight;
   B. contacting the slurry with an oxygen and nitrogen dioxide containing gas, the amount of nitrogen dioxide gas being in excess of the stoichiometric amount needed to oxidize the sulfidic material being treated; and,
   C. agitating the slurry to increase contact between the nitrogen dioxide gas and the sulfidic material and allow the nitrogen dioxide gas to oxidize the sulfidic material and render the copper value leachable as cupric ions, the reacted nitrogen dioxide being reduced to nitric oxide which is oxidized to nitrogen dioxide by the oxygen.

2. The process as set forth in claim 1 wherein the slurry produced in step (A) is at least 50% by weight solids.

3. The process as set forth in claim 1 wherein the slurry produced in step (A) is at least 67% by weight solids.

4. The process as set forth in claim 1 wherein the sulfidic material is a mineral selected from the group consisting of chalcopyrite, bornite, chalcocite, digenite, covellite, mixtures thereof, and concentrates thereof.

5. The process as set forth in claim 1 wherein the sulfidic material contains iron and a solid jarosite is formed in step (C).

6. The process as set forth in claim 1 wherein the sulfidic material also contains one or more metal values selected from the group consisting of silver, nickel, cobalt, molybdenum, zinc, and mixtures thereof and wherein in step (C) one or more of these metal values are rendered leachable.

7. A process for oxidizing a sulfidic mineral containing metal values of at least one metal selected from the group consisting of copper, silver, nickel, cobalt, molybdenum, zinc, iron and mixtures thereof to enable at least one of the metal values to be leached therefrom comprising the following steps:
   A. adding a sufficient amount of water to the sulfidic material while in particulate form to produce a noncaking slurry having a solids content of no less than 30% by weight;
   B. contacting the slurry with an oxygen and nitrogen dioxide containing gas, the amount of nitrogen dioxide gas being in excess of the stoichiometric amount needed to oxidize the sulfidic material being treated; and,
   C. agitating the slurry to increase contact between the nitrogen dioxide gas and the sulfidic material and allow the nitrogen dioxide gas to oxidize the sulfidic material and render at least one metal value leachable, the reacted nitrogen dioxide being reduced to nitric oxide which is oxidized to nitrogen dioxide by the oxygen.

8. The process as set forth in claim 7 wherein the sulfidic mineral contains iron and another metal value and wherein a substantial part of the iron is converted to a substantially water insoluble jarosite during the course of the leach.

9. The process as set forth in claim 7 wherein said contacting step is effected by sparging said oxygen and nitrogen dioxide containing gas through the slurry.

10. The process as set forth in claim 7 wherein the heat of reaction is dissipated by evaporation of water.

11. A process for oxidizing a sulfidic material containing copper values to enable the copper values to be leached therefrom comprising the following steps:
   A. adding a sufficient amount of water to the sulfidic material while in particulate form to produce a noncaking slurry having a solids content of no less than 30% by weight;
   B. contacting the slurry with an oxygen and nitrogen dioxide containing gas;
   C. agitating the slurry to increase contact between the nitrogen dioxide gas and the sulfidic material and to allow the nitrogen dioxide gas to oxidize the sulfidic material producing sulfate ions and rendering the copper values leachable as cupric ions, the reacted nitrogen dioxide being reduced to nitric oxide which is oxidized to nitrogen dioxide by the oxygen;

D. adding water to the slurry to solubilize cupric sulfate which precipitates in step C due to the solubility of the slurry for cupric sulfate being exceeded; and, E. separating the solubilized cupric ions from the remainder of the slurry.

12. A process for oxidizing a sulfidic material containing copper values to enable the copper values to be leached therefrom comprising the following steps:

A. adding a sufficient amount of water to the sulfidic material while in particulate form to produce a noncaking slurry having a solids content of no less than 30% by weight;

B. contacting the slurry with an oxygen and nitrogen dioxide containing gas; and, C. agitating the slurry to increase contact between the nitrogen dioxide gas and the sulfidic material and allow the nitrogen dioxide gas to oxidize the sulfidic material and render the copper values leachable as cupric ions, which precipitate as a water soluble cupric sulfate salt, the reacted nitrogen dioxide being reduced to nitric oxide which is oxidized to nitrogen dioxide by the oxygen.

* * * * *

UNITED STATES PATENT OFFICE
CERTIFICATE OF CORRECTION

Patent No. 4,144,310  Dated March 13, 1979

Inventor(s) Theodore C. Frankiewicz et al.

It is certified that error appears in the above-identified patent and that said Letters Patent are hereby corrected as shown below:

The term of this patent subsequent to January 2, 1995 has been disclaimed.

Signed and Sealed this

Eighth Day of May 1979

[SEAL]

Attest:

RUTH C. MASON
*Attesting Officer*

DONALD W. BANNER
*Commissioner of Patents and Trademarks*